United States Patent

Bucksch

[11] 4,391,354
[45] Jul. 5, 1983

[54] PISTON-AND-CYLINDER ASSEMBLY FOR HYDRAULIC DISK CLUTCH OR BRAKE

[75] Inventor: Manfred Bucksch, Friedrichshafen, Fed. Rep. of Germany

[73] Assignee: Zahnradfabrik Friedrichshafen AG, Friedrichshafen, Fed. Rep. of Germany

[21] Appl. No.: 250,025

[22] Filed: Apr. 1, 1981

[30] Foreign Application Priority Data

Apr. 2, 1980 [DE] Fed. Rep. of Germany ....... 3012791

[51] Int. Cl.$^3$ ......................... F16D 55/40; F01B 7/20; F16D 19/00
[52] U.S. Cl. ................................... 188/71.5; 188/72.3; 188/72.4; 188/367; 92/52; 92/63; 192/85 AA
[58] Field of Search .................... 188/71.1, 71.2, 71.5, 188/72.1, 361, 362, 72.3, 72.4, 366, 72.5, 106 P, 367; 192/85 AA, 85 CA, 86, 87.11; 92/52, 63, 65, 130 A

[56] References Cited

U.S. PATENT DOCUMENTS

| 3,177,994 | 4/1965 | Jewson | 188/366 |
|---|---|---|---|
| 3,384,214 | 5/1968 | Wilson | 192/87.11 |
| 3,576,241 | 4/1971 | Maurice et al. | 192/85 AA |
| 3,599,512 | 8/1971 | Wayman | 188/72.4 |
| 3,612,237 | 10/1971 | Honda | 92/63 |
| 3,744,605 | 7/1973 | Piret | 188/71.5 |
| 3,750,783 | 8/1973 | Ohtsuka et al. | 192/85 AA |
| 3,832,934 | 9/1974 | Dach et al. | 192/85 AA |
| 3,837,439 | 9/1974 | Piret | 192/85 AA |
| 3,927,737 | 12/1975 | Prillinger et al. | 188/71.5 |
| 3,946,837 | 3/1976 | Houser | 188/72.4 |
| 4,020,933 | 5/1977 | Gill | 192/86 |
| 4,125,059 | 11/1978 | Tuji | 92/63 |
| 4,144,955 | 3/1979 | Garnier | 188/72.4 |
| 4,325,471 | 4/1982 | Schuster | 188/72.4 |

Primary Examiner—Douglas C. Butler
Assistant Examiner—R. R. Diefendorf
Attorney, Agent, or Firm—Karl F. Ross

[57] ABSTRACT

A clutch or brake cylinder has an annular working space accommodating an annular piston which confronts a stack of interleaved friction plates adapted to couple the cylinder to a coaxial member rotatable relatively thereto, the piston being displaceable by fluid pressure toward the stack against the force of a Belleville spring. This piston occupies only part of the working space so as to leave an annular clearance in which an ancillary sealing ring is independently slidable. When fluid pressure is applied, part of that pressure pushes the sealing ring against the Belleville spring and lifts it off the piston which then can exert its full force upon the stack of friction plates. Extraction of the cylinder from a surrounding housing enables the piston and the sealing ring to be replaced by a larger piston, filling the entire cross-sectional area of the working space, if a greater coupling pressure is to be exerted.

4 Claims, 2 Drawing Figures

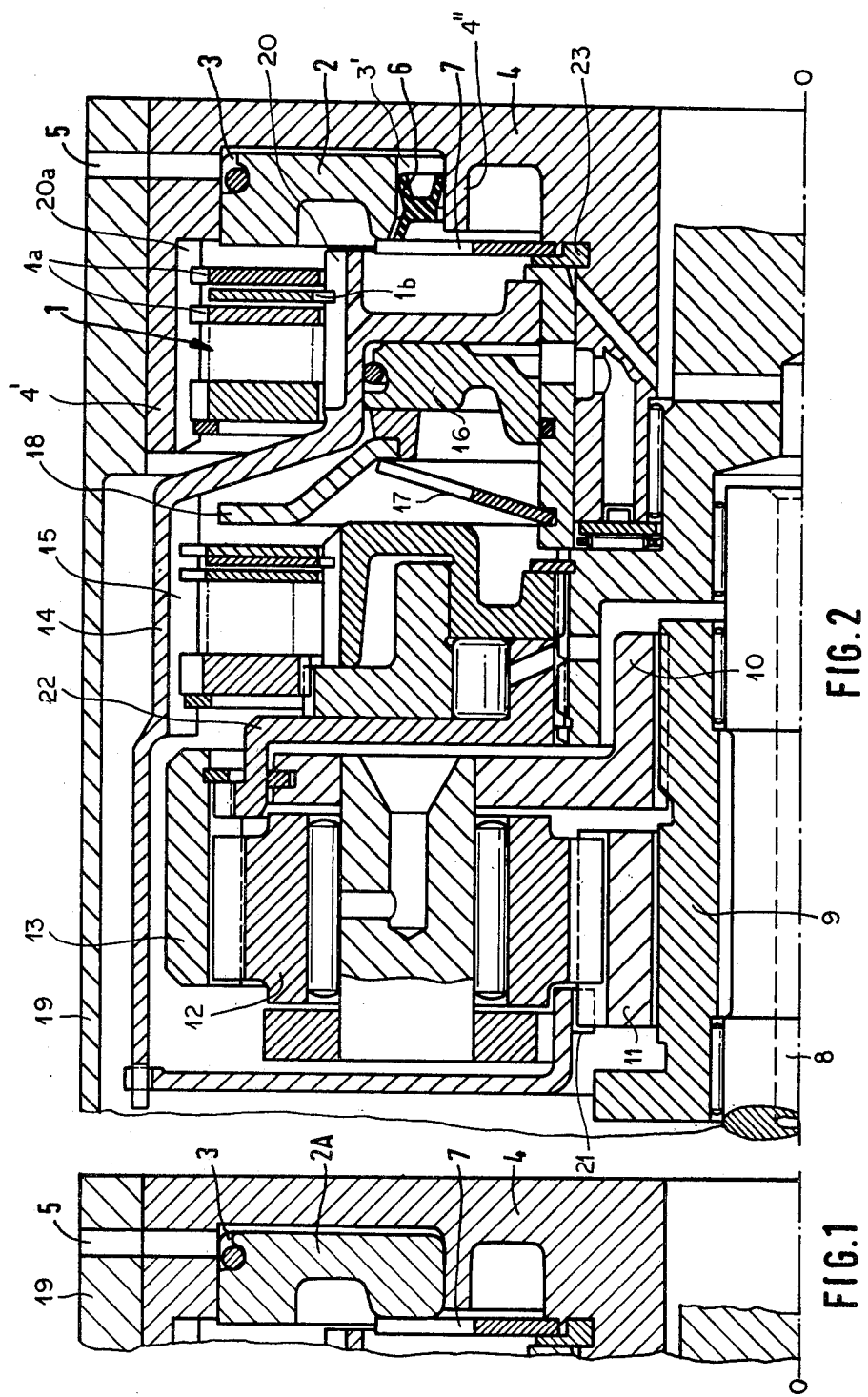

PISTON-AND-CYLINDER ASSEMBLY FOR HYDRAULIC DISK CLUTCH OR BRAKE

FIELD OF THE INVENTION

My present invention relates to a piston-and-cylinder assembly for a fluidically (especially hydraulically) operated disk clutch or brake.

BACKGROUND OF THE INVENTION

A clutch or brake of this type, e.g. as used for speed changes in a planetary-gear train, comprises a cylinder with an annular working space in which an annular piston is axially slidable under fluid pressure toward a stack of interleaved annular friction plates, some of these plates being positively linked with the cylinder while the rest are linked with a central shaft or other relatively rotating member to be coupled with that cylinder. The fluid pressure driving the piston into its operating position is resisted by spring means tending to keep the piston separated from the stack.

For manufacture as well as for installation it is convenient to use cylinders of the same size for clutches or brakes operable under different coupling pressures. For a device of lower power it is merely necessary to use a piston having an effective width less than that of the working space whereby only a fraction of the available fluid pressure is transmitted to the stack. In such an instance, however, one must reduce the effective cross-sectional area of that space in order to prevent the leakage of fluid past the piston. For this purpose it has been customary to weld or otherwise secure a stationary ring either to the peripheral cylinder wall or to a central boss constituting the outer and inner boundaries of the working space.

OBJECTS OF THE INVENTION

An object of my present invention is to avoid the need for structurally modifying such a clutch or brake cylinder if, for whatever reason, only a part of its annular working space is to be occupied by an associated piston.

Another object is to reduce the spring force which must be overcome by the smaller piston if that force is supplied by a Belleville spring or the like designed for use with a piston of larger size occupying the entire available space.

SUMMARY OF THE INVENTION

I realize these objects, in accordance with my present invention, by the provision of an ancillary ring which is slidable in an annular clearance left in the working space by the undersize piston, the ancillary ring being slidable independently of that piston under fluid pressure so as to bear upon the spring means resisting displacement of the piston. With the aforementioned annular clearance radially offset from the stack of friction plates, the portion of the fluid pressure acting upon the ancillary ring is not transmitted to the stack and is used merely to deform the spring means and to relieve the piston of its countervailing force whereby the full fluid pressure acting upon the piston becomes available for compressing the stack.

BRIEF DESCRIPTION OF THE DRAWING

The above and other features of my present invention will now be described in detail with reference to the accompanying drawing in which:

FIG. 1 is a fragmentary cross-sectional view of a piston-and-cylinder assembly for a conventional clutch or brake; and FIG. 2 is a more extensive cross-sectional view of the same assembly as modified in conformity with my invention.

SPECIFIC DESCRIPTION

FIGS. 1 and 2 show part of a housing 19, centered on an axis 0, in which a clutch or brake cylinder 4 is fixedly mounted. Cylinder 4 defines an annular working space 3, bounded by its peripheral wall 4' and a central boss 4'', in which an annular piston 2A (FIG. 1) or 2 (FIG. 2) is axially slidable. Piston 2A conventionally occupies the entire cross-sectional area of working space 3 whereas piston 2, designed for a clutch or brake of lower power, fills only part of that space so as to leave free an annular clearance 3' around boss 4''. Cylinder 4 also accommodates a stack 1 of interleaved annular friction plates or disks 1a and 1b, plates 1a being in sliding engagement with ribs 20a on the inner surface of cylinder wall 4' whereas plates 1b are in similar engagement with ribs 20 of a cylindrical member 14 freely rotatable inside housing 19 about a central shaft 8. Member 14, which is to be frictionally coupled with piston 2 upon the admission of hydraulic fluid through a port 5 into space 3, is coupled by way of teeth 21 with a sun gear 11 of an epicyclic train mounted on a sleeve 9 which is also freely rotatable on shaft 8. Sun gear 11 is in mesh with planet gears 12 (only one shown) on a carrier 10, the latter being likewise rotatable about shaft 8. A ring gear 13 meshes with planet gears 12 as well as with another freely rotatable carrier 22 which can be immobilized on cylinder 4 through another hydraulic clutch comprising a stack of friction plates 15 and a piston 18 loaded by a Belleville spring 17. The planetary-gear train 10–13 and other elements associated therewith are the subject matter of my commonly owned application Ser. No. 250,026 filed Apr. 1, 1981.

Piston 2 (or 2A) is nomally held separated from stack 1 by a Belleville spring 7 anchored to boss 4''. This spring extends in FIG. 2 past the annular clearance 3' so as to bear upon an inner rim of piston 2 radially offset from the stack 1. An ancillary ring 6 of elastomeric material fills the clearance 3' and seals it against piston 2 and boss 4'' while resting against spring 7.

Depending on whether the housing 19 is stationary or rotatable about axis 0, the assembly including piston 2 or 2A, cylinder 4 and stack 1 will act as a brake or as a clutch for the cylindrical member 14. Upon the admission of fluid to space 3 by way of port 5, piston 2 and ring 6 will be jointly displaced toward the left against the force of spring 7. When piston 2 makes contact with the first plate 1a of stack 1, its advance is slowed while ring 6 continues its axial movement to deflect the spring 7 away from the piston which therefore can now compress the stack 1 with the full force of the hydraulic fluid acting thereon. Upon the subsequent venting of space 3, spring 7 returns the piston 2 and the ring 6 to their illustrated normal position.

To substitute the full-size piston 2A of FIG. 1 for the undersize piston 2 of FIG. 2, it is merely necessary to withdraw the cylinder 4 from housing 19 and to remove the spring 7 which is held in position by a snap ring 23. Piston 2 and sealing ring 6 can then be jointly replaced by the piston 2A whereupon spring 7 may be reinserted together with snap ring 23, it being understood that the force of this spring is sufficient to control the movement of the larger piston 2A.

I claim:

1. In a fluidically operated speed-changing assembly comprising a cylinder with an annular working space, an annular piston axially slidable in said working space under pressure of an operating fluid, a stack of interleaved first and second annular friction plates confronting said piston, said first friction plates being positively linked with said cylinder, said second friction plates being positively linked with a relatively rotatable member to be coupled with said cylinder by fluid pressure forcing said piston against said stack, and spring means in said cylinder resisting a displacement of said piston toward said stack, the improvement wherein said piston occupies only part of said working space, leaving an annular clearance radially offset from said stack, and an ancillary ring is slidable independently of said piston in said clearance under pressure of said operating fluid while bearing only upon said spring means without coming into contact with said stack.

2. An assembly as defined in claim 1 wherein said ancillary ring consists of elastomeric material sealing said clearance.

3. An assembly as defined in claim 1 or 2 wherein said working space is bounded by a peripheral wall and a central boss of said cylinder, said piston and said stack adjoining said peripheral wall, said ancillary ring adjoining said boss.

4. An assembly as defined in claim 3 wherein said spring means comprises a Belleville spring seated on said boss, said Belleville spring extending past said ring and having an outer diameter greater than the inner diameter of said piston but smaller than the inner diameter of said stack.

* * * * *